United States Patent
Yu

(10) Patent No.: US 7,990,135 B2
(45) Date of Patent: Aug. 2, 2011

(54) APPARATUS AND METHOD FOR DETECTING POSITION OF MAGNETIC ELEMENT

(75) Inventor: Hsiang-Chieh Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 192 days.

(21) Appl. No.: 12/407,120

(22) Filed: Mar. 19, 2009

(65) Prior Publication Data

US 2009/0309582 A1 Dec. 17, 2009

(30) Foreign Application Priority Data

Jun. 11, 2008 (CN) .......................... 2008 1 0302105

(51) Int. Cl.
*G01B 7/14* (2006.01)
*G01R 33/06* (2006.01)
*H01L 43/08* (2006.01)
(52) U.S. Cl. ................................. 324/207.21
(58) Field of Classification Search .................. None
See application file for complete search history.

(56) References Cited

U.S. PATENT DOCUMENTS

| | | | |
|---|---|---|---|
| 3,325,904 A * | 6/1967 | Backus ........................... 33/568 |
| 5,856,743 A | 1/1999 | Juniman | |
| 7,728,720 B2 * | 6/2010 | Anderson ..................... 340/438 |
| 2008/0317452 A1 * | 12/2008 | Kim et al. ..................... 396/104 |

FOREIGN PATENT DOCUMENTS

| CN | 2306037 | 2/1999 |
|---|---|---|
| EP | 1887310 | 2/2008 |

* cited by examiner

*Primary Examiner* — Huy Phan
*Assistant Examiner* — Son Le
(74) *Attorney, Agent, or Firm* — Clifford O. Chi

(57) ABSTRACT

An exemplary apparatus for detecting whether a magnetic element is mounted at a correct position on a retaining member is provided. The apparatus includes a holder, a magnetoresistive sensor, and a processor. The magnetoresistive sensor is held by the holder and capable of sensing a present magnetic flux from the magnetic element to the magnetoresistive sensor. The processor is electrically connected to the magnetoresistive sensor and has a predetermined reference magnetic flux stored information therein, configured for obtaining the present magnetic flux and comparing the present magnetic flux with the reference magnetic flux information, thereby detecting whether a magnetic element is mounted at a correct position on a retaining member.

15 Claims, 1 Drawing Sheet

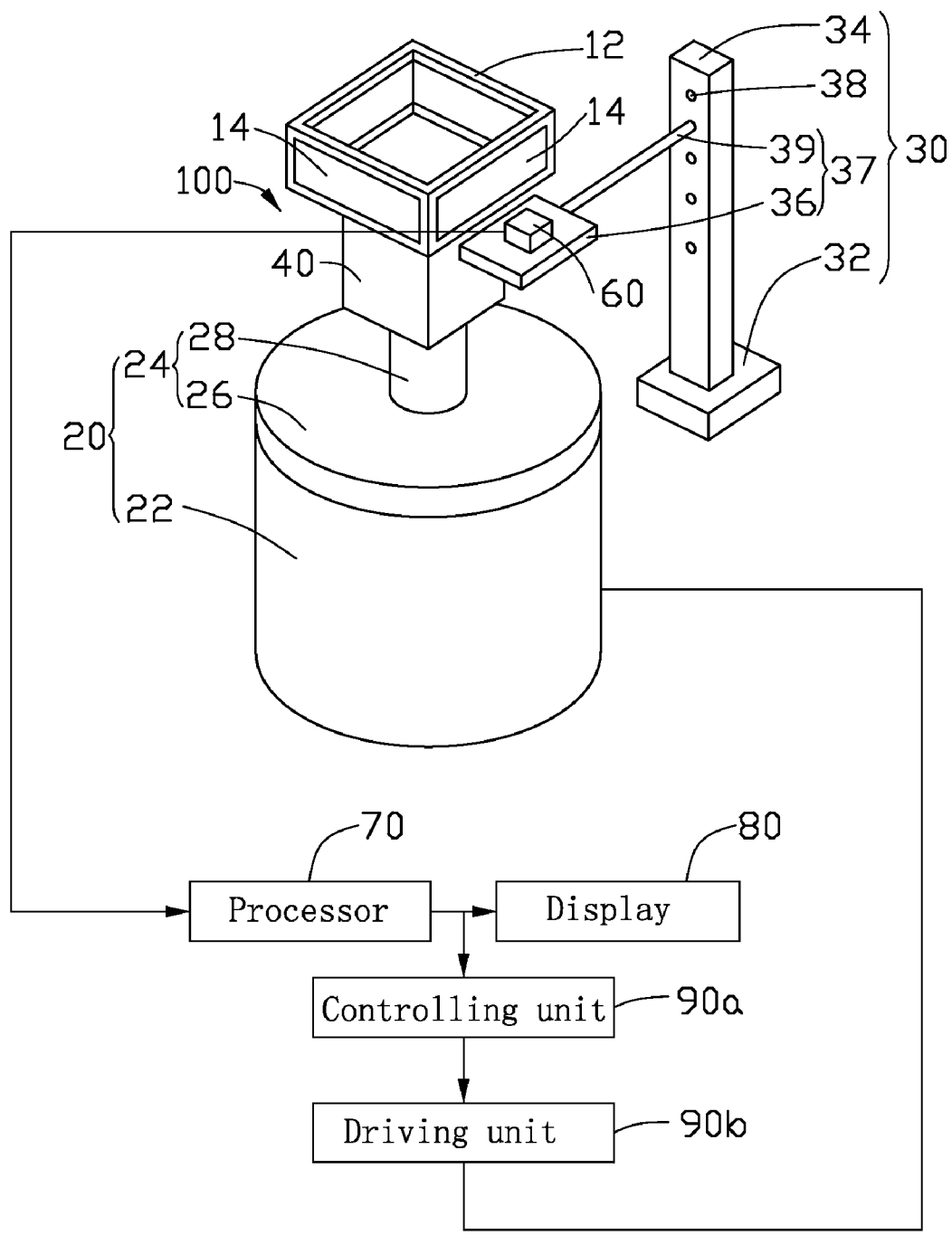

APPARATUS AND METHOD FOR DETECTING POSITION OF MAGNETIC ELEMENT

BACKGROUND

1. Technical Field

The present disclosure relates to an apparatus and a method for detecting whether a magnetic element is mounted at a correct position on a retaining member.

2. Description of Related Art

Magnetic elements are commonly used, for example, in voice coil motors. Voice coil motors are widely used as lens actuators in camera modules. Magnetic field generators are key components of voice coil motors. A typical magnetic field generator includes a retaining frame, and at least four magnetic elements mounted at four sides of the retaining frame.

High precision in mounting the magnetic elements at proper positions on the retaining frame is required. For example, if one of the magnetic elements is not mounted correctly, the magnetic field generated by the magnetic elements may not be precise enough to properly drive the lens module to move along a central axis thereof.

What is needed, therefore, is an apparatus and a method for detecting a position of a magnetic element which can overcome the above shortcomings.

BRIEF DESCRIPTION OF THE DRAWING

Many aspects of the present apparatus and method can be better understood with reference to the accompanying drawing. Elements in the drawing are not necessarily drawn to scale, the emphasis instead being placed upon clearly illustrating the principles of the present apparatus and method. Moreover, in the drawing, like reference numerals designate corresponding parts.

The drawing is a schematic view of an apparatus for detecting whether a number of magnetic elements are mounted at correct positions on a retaining member, in accordance with an embodiment, also showing a retaining member attached on the apparatus.

DETAILED DESCRIPTION OF EMBODIMENTS

Embodiments of the present apparatus and method will now be described in detail below and with reference to the drawing.

Referring to the drawing, this shows an exemplary apparatus 100 for detecting whether a number of magnetic elements 14 are mounted at correct positions on a retaining member 12. The apparatus 100 mainly includes a motor 20, a holder 30, a magnetoresistive sensor 60, and a processor 70.

The retaining member 12 is a rectangular retaining frame. The magnetic elements 14 are required to be precisely mounted at correct positions on the four sides of the retaining member 12, respectively. In particular, the center of each magnetic element 14 is required to be aligned with the center of a corresponding side of the retaining member 12.

The motor 20 includes a main body 22, a cover 26, and a rotatable cylindrical shaft 28. The cover 26 covers the main body 22. The shaft 28 extends outwards from the cover 26. A rectangular sleeve 40 is mounted to the end of the shaft 28. The retaining member 12 is removably engaged with the rectangular sleeve 40, and thus is supported by the rectangular sleeve 40. In the present embodiment, the retaining member 12 is sleeved on a top portion of the rectangular sleeve 40. In other embodiments, the retaining member 12 may be more fully sleeved on the rectangular sleeve 40. In still other embodiments, the retaining member 12 may have a bottom portion, which is suitably attached to the top of the rectangular sleeve 40.

The holder 30 mainly includes a base 32, a post 34, and a supporter 37. The post 34 is mounted on the base 32. The post 34 has a number of engaging holes 38 formed therein, the engaging holes 38 arranged along a lengthwise direction of the post 34. The supporter 37 is generally adjacent to the retaining member 12. The supporter 37 has a pole 39, and a substrate 36 attached to the pole 39. The pole 39 is removably engaged in a selected one of the engaging holes 38. Thus, a position of the substrate 36 relative to the retaining member 12 is adjustable.

The magnetoresistive sensor 60 is positioned on the substrate 36. In order to reduce or eliminate any influence by the other magnetic elements 14 on the other sides of the retaining member 12, the magnetoresistive sensor 60 is typically positioned closely in front of the side of the retaining member 12 where the magnetic element 14 to be detected is located. More particularly, the magnetoresistive sensor 60 is typically positioned in front of and adjacent to a center area of the side of the retaining member 12. In the present embodiment, a center of the magnetoresistive sensor 60 is somewhat offset from a center of the side of the retaining member 12. In another embodiment, the center of the magnetoresistive sensor 60 is aligned with the center of the side of the retaining member 12. Irrespective of the selected exact position of the magnetoresistive sensor 60, the magnetoresistive sensor 60 is capable of sensing a present magnetic flux from the adjacent magnetic element 14, and outputting a resistive signal corresponding to the present magnetic flux sensed.

The processor 70 is electrically connected to the magnetoresistive sensor 60, and stores information on a predetermined standard (normal) magnetic flux therein. The standard magnetic flux is that which would be sensed by the magnetoresistive sensor 60 at its present position when a magnetic element 14 is mounted at the correct position on the side of the retaining member 12. That is, the standard magnetic flux is used as a reference magnetic flux (see below).

When the retaining member 12 is in position ready for one of the magnetic elements 14 to be detected, the magnetoresistive sensor 60 senses the present magnetic flux from the magnetic element 14, and outputs a corresponding resistive signal to the processor 70. The processor 70 then processes the resistive signal to obtain information on the present magnetic flux. The processor 70 then compares the present magnetic flux information with the standard magnetic flux stored therein, and thereby detects whether the magnetic element 14 is mounted at the correct position on the side of the retaining member 12.

A display 80 can be electrically connected to the processor 70. The display 80 can be configured for displaying or not displaying "OK," according to whether or not the currently sensed magnetic element 14 is mounted at the correct position on the side of the retaining member 12.

In addition, a controlling unit 90a and a driving unit 90b can also be provided. The controlling unit 90a is connected to the processor 70, and the driving unit 90b is connected to both the controlling unit 90a and the motor 20. The controlling unit 90a is configured for controlling the driving unit 90b to drive the motor 20 to work, i.e., to drive the shaft 28 to rotate the retaining member 12 until another one of the magnetic elements 14 is in position ready to be detected. That is, the retaining member 12 is rotated so that the magnetoresistive sensor 60 is generally in front of and adjacent to a next magnetic element 14 to be detected. In the illustrated embodiment, such rotation of the retaining member 12 may be coupled with raising and lowering of the rectangular sleeve 40, in order that the retaining member 12 does not collide with the substrate 36.

In the method for detecting whether the four magnetic elements 14 are mounted at the respective correct positions on the retaining member 12, preferably, a relative position between the magnetoresistive sensor 60 and each of the sides of the retaining member 12 under detection is constant. In such case, the standard magnetic flux stored in the processor 70 is a constant value throughout the measuring process. Otherwise, the standard magnetic flux information stored in the processor 70 needs to have two or more values.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An apparatus for detecting whether a magnetic element is mounted at a correct position on a retaining member, the retaining member comprising a rectangular frame, the apparatus comprising:
   a holder comprising a post and a supporter, the post having a plurality of engaging holes formed therein arranged along a lengthwise direction thereof, the supporter having a pole removably engagable in a selected one of the engaging holes, and a substrate attached to the pole;
   a magnetoresistive sensor positioned at the substrate, and capable of sensing a present magnetic flux from the magnetic element;
   a processor electrically connected to the magnetoresistive sensor and having a predetermined reference magnetic flux information stored therein, the processor configured for receiving the present magnetic flux and comparing the present magnetic flux with the reference magnetic flux information, and thereby detecting whether the magnetic element is mounted at a correct position on the retaining member; and
   a motor comprising a rotatable shaft, the shaft comprising a rectangular sleeve mounted on an end thereof, and the rectangular sleeve configured for having the retaining member removably engaged therewith.

2. The apparatus as described in claim 1, wherein the substrate is positioned adjacent to a desired position of the retaining member, so that the magnetoresistive sensor is positioned generally in front of and adjacent to an area corresponding to the correct position of the magnetic element on the retaining member.

3. The apparatus as described in claim 2, wherein a center of the magnetoresistive sensor is positioned in alignment with a center of the area corresponding to the correct position of the magnetic element.

4. The apparatus as described in claim 2, wherein a center of the magnetoresistive sensor is positioned offset from a center of the area corresponding to the correct position of the magnetic element.

5. The apparatus as described in claim 1, wherein the reference magnetic flux is a magnetic flux which would be sensed by the magnetoresistive sensor when the magnetic element is mounted at the correct position on the retaining member.

6. The apparatus as described in claim 1, wherein the magnetoresistive sensor is configured for outputting a resistive signal corresponding to the sensed magnetic flux to the processor, and the processor is configured for processing the resistive signal to obtain the present magnetic flux.

7. The apparatus as described in claim 1, further comprising a controlling unit connected to the processor and a driving unit connected to both the controlling unit and the motor, the controlling unit configured for controlling the driving unit to drive the shaft to rotate.

8. The apparatus as described in claim 1, further comprising a display electrically connected to the processor, the display configured for displaying information on whether or not the magnetic element is mounted at the correct position on the retaining member.

9. The apparatus as described in claim 1, wherein a relative position between the magnetoresistive sensor and each of the sides of the retaining member under detection is constant, and the predetermined reference magnetic flux information is a constant value.

10. An apparatus for detecting whether a magnetic element is mounted at a correct position on a retaining member, the retaining member comprising a rectangular frame, the apparatus comprising:
    a magnetoresistive sensor positioned generally in front of and adjacent to a predetermined correct position of the magnetic element on the retaining member, the magnetoresistive sensor capable of sensing a present magnetic flux from the magnetic element;
    a processor electrically connected to the magnetoresistive sensor and having a predetermined reference magnetic flux information stored therein, the processor configured for receiving the present magnetic flux and comparing the present magnetic flux with the reference magnetic flux information, and thereby detecting whether the magnetic element is mounted at the correct position on the retaining member; and
    a motor comprising a rotatable shaft, the shaft comprising a rectangular sleeve mounted on an end thereof, and the rectangular sleeve configured for having the retaining member removably engaged therewith.

11. The apparatus as described in claim 10, wherein a center of the magnetoresistive sensor is positioned in alignment with an area corresponding to the correct position of the magnetic element on the retaining member.

12. The apparatus as described in claim 10, wherein a center of the magnetoresistive sensor is positioned offset from an area corresponding to the correct position of the magnetic element on the retaining member.

13. The apparatus as described in claim 10, wherein the reference magnetic flux is a magnetic flux which would be sensed by the magnetoresistive sensor when the magnetic element is mounted at the correct position on the retaining member.

14. The apparatus as described in claim 10, further comprising a holder, the holder comprising a post and a supporter, the post having a plurality of engaging holes formed therein arranged along a lengthwise direction thereof, the supporter having a pole and a substrate, the pole removably engagable in a selected one of the engaging holes, the substrate attached to the pole, and the magnetoresistive sensor being positioned at the substrate.

15. The apparatus as described in claim 10, wherein a relative position between the magnetoresistive sensor and each of the sides of the retaining member under detection is constant, and the predetermined reference magnetic flux information is a constant value.

* * * * *